US011804621B2

(12) United States Patent
Guo et al.

(10) Patent No.: US 11,804,621 B2
(45) Date of Patent: Oct. 31, 2023

(54) PARAMETER TUNING METHOD OF ENERGY STORAGE SYSTEM AND THE ENERGY STORAGE SYSTEM

(71) Applicant: Shenzhen Cubenergy Co., Ltd., Shenzhen (CN)

(72) Inventors: Zijian Guo, Shenzhen (CN); Xi Zheng, Shenzhen (CN); Gengying Li, Shenzhen (CN); Ping He, Shenzhen (CN); Guoping Hu, Shenzhen (CN); Jinlai Shang, Shenzhen (CN); Xiaoli Guo, Shenzhen (CN)

(73) Assignee: Shenzhen Cubernergy Co., Ltd., Shenzhen (CN)

( * ) Notice: Subject to any disclaimer, the term of this patent is extended or adjusted under 35 U.S.C. 154(b) by 0 days.

(21) Appl. No.: 17/985,359

(22) Filed: Nov. 11, 2022

(65) Prior Publication Data

US 2023/0207898 A1 Jun. 29, 2023

(30) Foreign Application Priority Data

Dec. 28, 2021 (CN) .......................... 202111624695.7

(51) Int. Cl.
*G05D 3/12* (2006.01)
*G05D 5/00* (2006.01)
(Continued)

(52) U.S. Cl.
CPC ............ *H01M 10/425* (2013.01); *G05B 6/02* (2013.01); *H01M 10/441* (2013.01);
(Continued)

(58) Field of Classification Search
CPC ............ H01M 10/425; H01M 10/441; H01M 10/482; G05B 6/02; H02J 7/0013;
(Continued)

(56) References Cited

U.S. PATENT DOCUMENTS 8,933,572 B1 * 1/2015 Abdur-Rahim ........... F03D 7/00
290/55
2012/0207622 A1 * 8/2012 Ebisawa ............... F04D 27/001
417/307
(Continued)

FOREIGN PATENT DOCUMENTS

CN 105870949 A 8/2016
CN 106444363 A 2/2017
CN 111725829 A 9/2020

*Primary Examiner* — Zhipeng Wang

(57) ABSTRACT

The invention provides a parameters tuning method of energy storage system and the energy storage system, and the method comprises the following steps: using PID control module to construct a closed-loop control subsystem of energy dispatching; acquiring PID initial parameters according to the energy dispatching model of the energy storage system; setting an adaptive model in the PID control module, and processing the PID initial parameters through the adaptive model to obtain PID adjusted and modified parameters; using the PID adjusted and modified parameters to modify the PID parameters and get the PID tuning parameters. What's more, the system comprises a battery module, a bidirectional converter device, an energy dispatching subsystem and a closed-loop control subsystem; and the closed-loop control subsystem is provided with a PID control module, and the PID control module is provided with an adaptive model for realizing the parameters tuning method of the energy storage system. In addition, the invention can realize the parameters tuning of the energy storage system, so that the control can adapt to the characteristics of the distributed energy storage system, deal with the uncertainty to achieve better control effect, and reduce the failure rate and maintenance cost.

8 Claims, 4 Drawing Sheets

(51) Int. Cl.
   *G05D 9/00* (2006.01)
   *G05D 11/00* (2006.01)
   *G05D 17/00* (2006.01)
   *H01M 10/42* (2006.01)
   *H02J 7/00* (2006.01)
   *G05B 6/02* (2006.01)
   *H01M 10/48* (2006.01)
   *H01M 10/44* (2006.01)
   *H02M 7/5387* (2007.01)

(52) U.S. Cl.
   CPC ......... *H01M 10/482* (2013.01); *H02J 7/0013* (2013.01); *H02J 7/0048* (2020.01); *H02J 7/00712* (2020.01); *H02M 7/53873* (2013.01); *H02J 2207/20* (2020.01)

(58) Field of Classification Search
   CPC .. H02J 7/0048; H02J 7/00712; H02J 2207/20; H02M 7/53873
   See application file for complete search history.

(56) References Cited

U.S. PATENT DOCUMENTS

| | | | |
|---|---|---|---|
| 2021/0098990 A1* | 4/2021 | Peng | H02J 3/32 |
| 2023/0092851 A1* | 3/2023 | Sayyarodsari | G05B 13/042 700/29 |

* cited by examiner

PARAMETER TUNING METHOD OF ENERGY STORAGE SYSTEM AND THE ENERGY STORAGE SYSTEM

TECHNICAL FIELD

The invention relates to the technical field of modular energy storage system and its parameter tuning, in particular to a parameter tuning method of energy storage system and the energy storage system.

BACKGROUND

Energy storage systems include input and output of energy and materials, energy conversion and storage equipment. Energy storage systems involve many kinds of energy, many kinds of equipment, many kinds of substances and many processes. The energy storage system shown in FIG. 1 is a complex energy system that changes with time. The distributed energy storage systems are more complex, and the response ability of the systems in abnormal and dangerous situations is very important.

PID (Proportional, Integral and Differential) control is a control method that combines the three links of proportional, integral and differential. PID control can realize closed-loop control for energy storage system. However, due to the uncertainty of the power system, especially the new environmental protection power systems such as wind power and solar power generation, the ability to respond to the uncertainty should be controlled in the energy dispatching of the energy storage system.

SUMMARY

In order to solve the above technical problems, the invention provides a parameters tuning method of energy storage system, and it comprises the steps:

S100, using PID control module to construct a closed-loop control subsystem of energy dispatching;

S200, acquiring PID initial parameters according to the energy dispatching model of the energy storage system;

S300, setting an adaptive model in the PID control module, and processing the PID initial parameters through the adaptive model to obtain PID adjusted and modified parameters;

S400, using the PID adjusted and modified parameters to modify the PID parameters and get the PID tuning parameters.

Optionally, in step S300, the process of processing the PID initial parameters through the adaptive model to obtain the PID adjusted and modified parameters is as follows:

S310, determining the response curve of the closed-loop control subsystem under the unit step by using the PID initial parameters;

S320, predicting energy dispatching through the response curve, and carrying out prediction evaluation to obtain the predicted deviation amount;

S330, converting the predicted deviation amount into fuzzy variables by using the quantization factor, and obtaining the PID basic modified parameters according to the preset fuzzy rules;

S340, carrying out the fuzzy treatment of the PID basic modified parameters to obtain the PID adjusted and modified parameters.

Optionally, in step S200, the predetermined strategy set by the energy dispatching model is that: generating multiple groups of dispatching schemes according to dispatching requirements, and predicting power generation and/or consumption through monitoring data; analyzing the charging and/or discharging loss of each group of dispatching schemes according to the prediction, and selecting the dispatching scheme with the lowest loss as the dispatching execution scheme.

Optionally, in step S320, the way of energy dispatching prediction through the response curve is as follows:

determining the response function according to the response curve;

determining the deviation direction by taking derivation of the response function in the prediction time domain;

calculating the deviation value through the response function with a predetermined prediction time;

combining the deviation direction with the deviation value to form a deviation vector;

determining the predicted deviation amount of the energy dispatching control parameters through the deviation vector.

Optionally, in step S400, after the PID tuning parameters are obtained, analyzing the stability of the system control through the PID tuning parameters, and sending out an alarm signal if the stability does not meet the requirements.

The invention also provides a energy storage system, and it comprises a battery module, a bidirectional converter device, an energy dispatching subsystem and a closed-loop control subsystem;

and the battery module comprises a plurality of lithium iron phosphate battery modules, and the lithium iron phosphate batteries arranged in the lithium iron phosphate battery modules are used for storing electric energy;

and the bidirectional converter device comprises a voltage stabilizing and rectifying assembly and an inverter assembly, wherein the voltage stabilizing and rectifying assembly and the inverter assembly are both connected with the battery module; the voltage stabilizing and rectifying assembly is connected with the power generation equipment and used for regulating the generated power to charge the batteries, and the inverter assembly is connected with the power transmission equipment and used for changing the electric energy stored in the batteries into the power supply that can be used by the electric equipment;

the energy dispatching subsystem is connected with the battery module and the bidirectional converter device respectively, and the energy dispatching subsystem is internally provided with the energy dispatching model, and the energy dispatching subsystem is used for monitoring the electric quantity of the battery module, and the energy dispatching model controls the bidirectional converter device to dispatch the charging and discharging according to PID tuning parameters and the predetermined strategy;

in addition, the closed-loop control subsystem comprises a PID control module, wherein the PID control module is internally provided with the adaptive model, and the adaptive model is used for obtaining PID adjusted and modified parameters by adopting the parameters tuning method of the energy storage system; and the PID control module uses the PID adjusted and modified parameters to modify the PID initial parameters and obtain the PID tuning parameters.

Optionally, there are multiple groups of the battery module, and they are arranged in a distributed manner; and the energy dispatching subsystem monitors the real-time electric quantity, charging quantity and discharging quantity of each battery module;

the predetermined strategy of the energy dispatching model is that: generating multiple groups of dispatching schemes according to dispatching requirements, and predicting power generation and/or consumption by monitoring data; analyzing the charging and/or discharging loss of each group of dispatching schemes according to the prediction, and selecting the dispatching scheme with the lowest loss as the dispatching execution scheme.

Optionally, the voltage stabilizing and rectifying assembly comprises a rectifying circuit and a voltage stabilizing circuit, wherein the rectifying circuit converts the alternating current of the power generation equipment into the direct current, and the voltage stabilizing circuit stabilizes the voltage of the direct current to be the same as that of the battery module.

Optionally, the inverter assembly comprises an inverter bridge circuit, a logic control circuit and a filter circuit, wherein the inverter bridge circuit is used for converting the direct current of the battery module into alternating current; the filter circuit is used for carrying out the filter treatment of the alternating current; and the logic control circuit is used for carrying out the logic control of the process of converting the direct current into the alternating current.

Optionally, the energy dispatching subsystem is connected with a communication module, and the communication module is used for connecting the network to realize data interaction.

According to the parameters tuning method of the energy storage system and the energy storage system, the PID control module is adopted to construct the closed-loop control subsystem of energy dispatching. And the initial parameters of the energy dispatching control of the energy storage system are processed by the adaptive model to obtain the PID adjusted and modified parameters. And the PID adjusted and modified parameters are used to modify the energy dispatching control parameters to realize parameter tuning, so that the control can adapt to the characteristics of the distributed energy storage system, deal with the uncertainty to achieve better control effect, and reduce the failure rate and maintenance cost.

Other features and advantages of the invention will be set forth in the following specification, and in part, these features and advantages will be obvious from the specification, or may be learned during the practice of the invention. The objects and other advantages of the present invention can be realized and obtained according to the structure particularly pointed out in the written specification, claims and attached figures.

The technical scheme of that invention will be further described in detail by the following attached figures and embodiments.

BRIEF DESCRIPTION OF DRAWINGS

The attached figures are used to provide a further understanding of the invention, and form a part of the specification. Together with the embodiments of the invention, the attached figures are used to explain the invention, but do not limit the invention. In the attached figures.

DETAILED DESCRIPTION OF EMBODIMENTS

The preferred embodiments of the present invention will be described with reference to the attached figures. It should be understood that the preferred embodiments described here are only for illustration and explanation of the present invention, and are not intended to limit the present invention.

Figure 1:
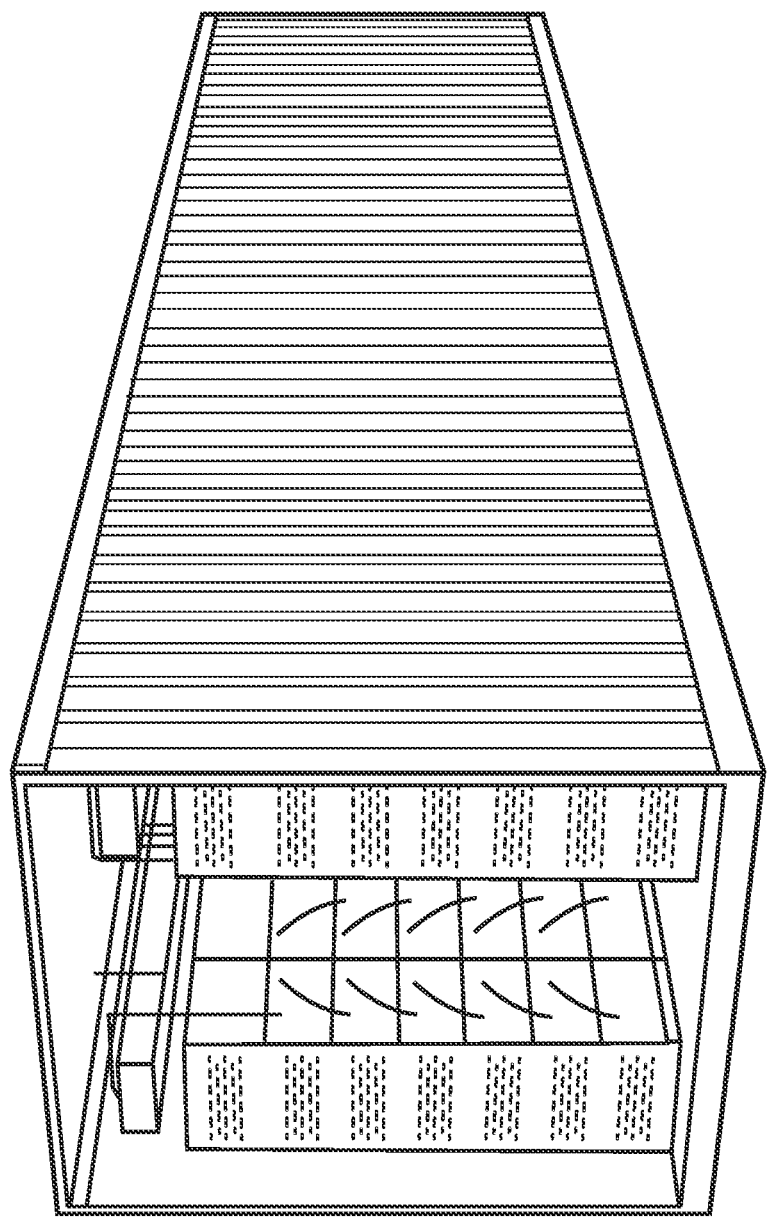
FIG. 1 is a schematic diagram of an existing energy storage system.
Figure 2:
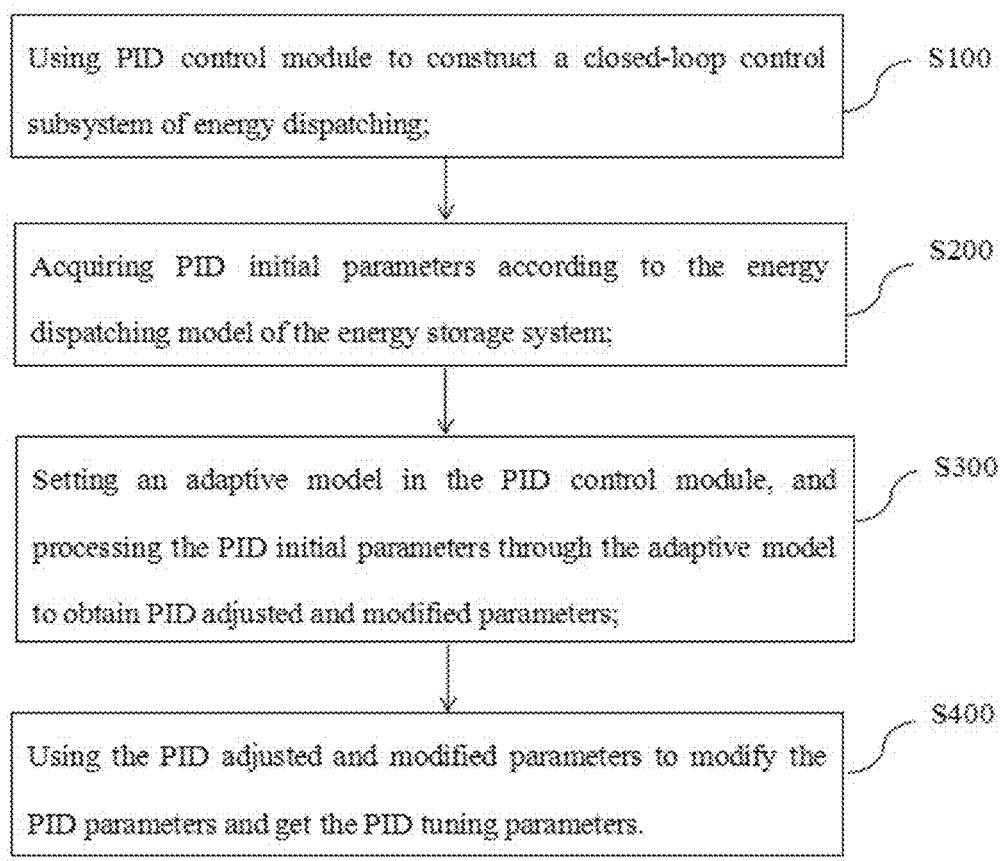
FIG. 2 is a flowchart of the parameters tuning method of energy storage system in an embodiment in the present invention.
Figure 3:
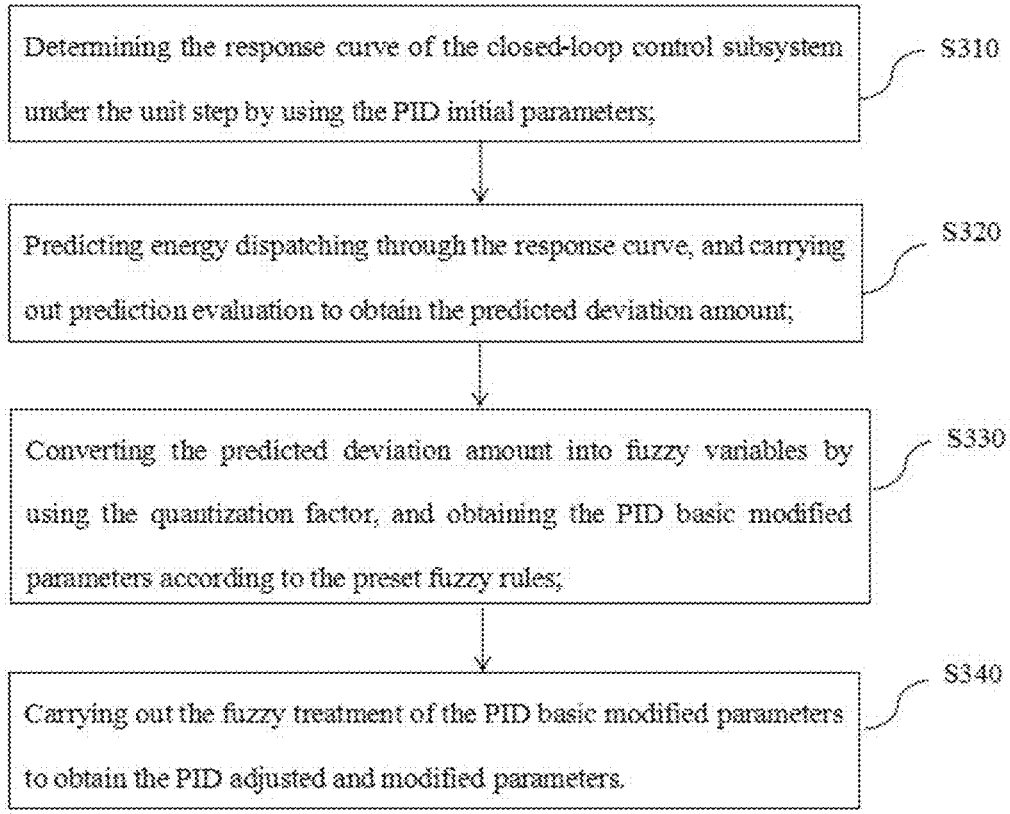
FIG. 3 is a flowchart of the adaptive model processing the PID initial parameters to obtain the PID adjusted and modified parameters in the embodiment of the parameters tuning method of energy storage system in the present invention.

As shown in the FIG. 1, the invention provides a parameters tuning method of energy storage system, and it comprises the steps:

S100, using PID control module to construct a closed-loop control subsystem of energy dispatching;

S200, acquiring PID initial parameters according to the energy dispatching model of the energy storage system;

S300, setting an adaptive model in the PID control module, and processing the PID initial parameters through the adaptive model to obtain PID adjusted and modified parameters;

S400, using the PID adjusted and modified parameters to modify the PID parameters and get the PID tuning parameters.

The working principle and beneficial effects of the technical scheme are as follows: In this scheme, the PID control module is adopted to construct the closed-loop control subsystem of energy dispatching. And the initial parameters of the energy dispatching control of the energy storage system are processed by the adaptive model to obtain the PID adjusted and modified parameters. And the PID adjusted and modified parameters are used to modify the energy dispatching control parameters to realize parameter tuning, so that the control can adapt to the characteristics of the distributed energy storage system, deal with the uncertainty to achieve better control effect, and reduce the failure rate and maintenance cost.

In an embodiment, in step S300, the process of processing the PID initial parameters through the adaptive model to obtain the PID adjusted and modified parameters is as follows:

S310, determining the response curve of the closed-loop control subsystem under the unit step by using the PID initial parameters;

S320, predicting energy dispatching through the response curve, and carrying out prediction evaluation to obtain the predicted deviation amount;

S330, converting the predicted deviation amount into fuzzy variables by using the quantization factor, and obtaining the PID basic modified parameters according to the preset fuzzy rules;

S340, carrying out the fuzzy treatment of the PID basic modified parameters to obtain the PID adjusted and modified parameters.

The working principle and beneficial effects of the technical scheme are as follows: the adaptive model of the scheme adopts the response curve under the unit step to predict the energy dispatching, converts the predicted deviation amount into fuzzy variables, obtains the PID basic modified parameters based on the fuzzy variables according to the preset fuzzy rules, and then performs fuzzy processing to obtain the PID adjusted and modified parameters. And the adaptive model and the energy dispatching model have a high degree of fit, and the parameters tuning effect can be improved by adopting the method.

In an embodiment, in step S200, the predetermined strategy set by the energy dispatching model is that: generating multiple groups of dispatching schemes according to dispatching requirements, and predicting power generation and/or consumption through monitoring data; analyzing the charging and/or discharging loss of each group of dispatching schemes according to the prediction, and selecting the dispatching scheme with the lowest loss as the dispatching execution scheme.

The working principle and beneficial effects of the technical scheme are as follows: The energy storage system of this scheme is a modular distributed system, and there are multiple groups of the battery module, and they are arranged in a distributed manner; and the energy dispatching subsystem monitors the real-time electric quantity, charging quantity and discharging quantity of each battery module. What's more, setting the dispatching model in the energy dispatching subsystem, and predicting power generation and/or consumption by monitoring data; analyzing the charging and/or discharging loss of each group of dispatching schemes according to the prediction, and selecting the dispatching scheme with the lowest loss as the dispatching execution scheme, so that the energy consumption of the energy storage system can be reduced and the energy storage utilization rate can be improved.

In an embodiment, in step S320, the way of energy dispatching prediction through the response curve is as follows:

determining the response function according to the response curve;

determining the deviation direction by taking derivation of the response function in the prediction time domain;

calculating the deviation value through the response function with a predetermined prediction time;

combining the deviation direction with the deviation value to form a deviation vector;

determining the predicted deviation amount of the energy dispatching control parameters through the deviation vector.

The working principle and beneficial effects of the technical scheme are as follows: In the scheme, the response function constructed by the response curve, in the prediction time domain, the deviation direction and deviation value are obtained by numerical analysis, and the deviation vector is formed by combining the deviation direction and deviation value, so as to determine the predicted deviation amount of energy dispatching control parameters. The scheme can guarantee the objectivity of prediction, avoid interference and improve the prediction accuracy, thus ensuring the accuracy of control.

In an embodiment, in step S400, after the PID tuning parameters are obtained, analyzing the stability of the system control through the PID tuning parameters, and sending out an alarm signal if the stability does not meet the requirements.

The working principle and beneficial effects of the technical scheme are as follows: This scheme evaluates the stability of the system control. After obtaining the PID tuning parameters, the stability evaluation results of the system control are obtained through the analysis of the PID tuning parameters. If the stability evaluation results do not meet the requirements, it indicates that the system has stability risks, suggesting that corresponding measures should be taken to improve the stability to ensure the safety and reliability of the system operation.

Figure 4:
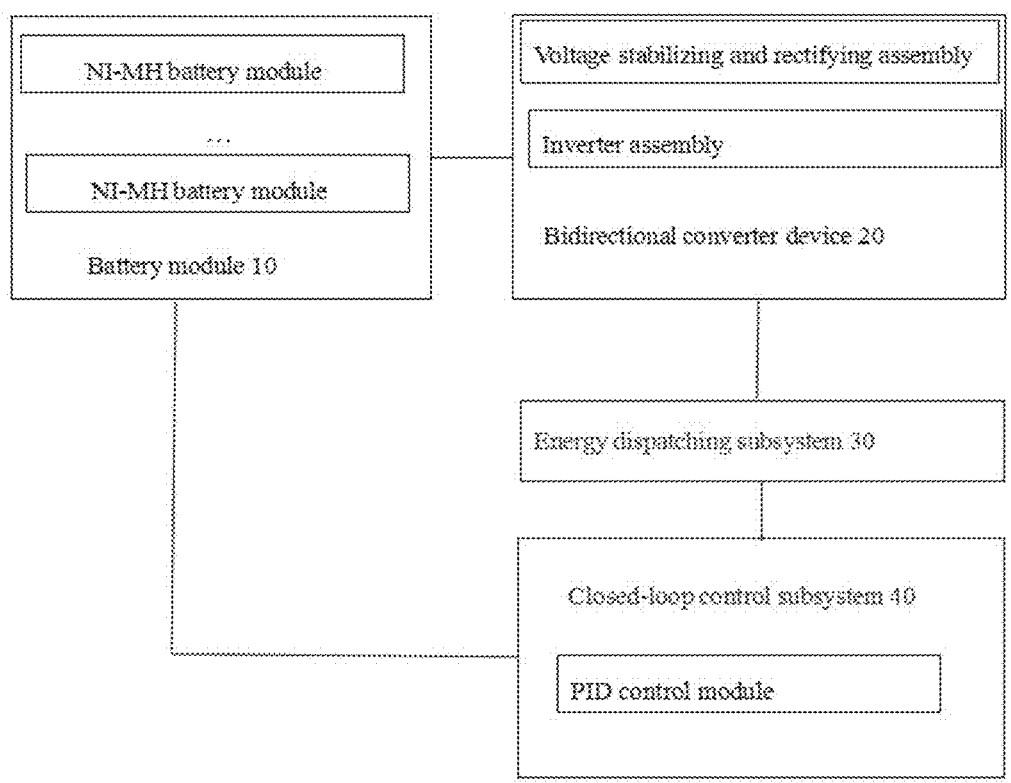
FIG. 4 is a schematic diagram of the energy storage system in an embodiment in the present invention.

The embodiment of the invention provides an energy storage system, as shown in FIG. 4, which comprises a battery module 10, a bidirectional converter device 20, an energy dispatching subsystem 30 and a closed-loop control subsystem 40;

and the battery module 10 comprises a plurality of lithium iron phosphate battery modules, and the lithium iron phosphate batteries arranged in the lithium iron phosphate battery modules are used for storing electric energy;

and the bidirectional converter device 20 comprises a voltage stabilizing and rectifying assembly and an inverter assembly, wherein the voltage stabilizing and rectifying assembly and the inverter assembly are both connected with the battery module 10; the voltage stabilizing and rectifying assembly is connected with the power generation equipment and used for regulating the generated power to charge the batteries, and the inverter assembly is connected with the power transmission equipment and used for changing the electric energy stored in the batteries into the power supply that can be used by the electric equipment;

the energy dispatching subsystem 30 is connected with the battery module 10 and the bidirectional converter device 20 respectively, and the energy dispatching subsystem 30 is internally provided with the energy dispatching model, and the energy dispatching subsystem 30 is used for monitoring the electric quantity of the battery module, and the energy dispatching model controls the bidirectional converter device to dispatch the charging and discharging according to PID tuning parameters and the predetermined strategy;

in addition, the closed-loop control subsystem 40 comprises a PID control module, wherein the PID control module is internally provided with the adaptive model, and the adaptive model is used for obtaining PID adjusted and modified parameters by adopting the parameters tuning method of the energy storage system; and the PID control module uses the PID adjusted and modified parameters to modify the PID initial parameters and obtain the PID tuning parameters.

The working principle and beneficial effects of the technical scheme are as follows: The energy storage system of this scheme is a modular distributed system, and the energy storage system comprises a battery module, a bidirectional converter device, an energy dispatching subsystem and a closed-loop control subsystem; And the module (PACK) adopts modular lithium iron phosphate battery, and the energy dispatching subsystem (EMS) is used for dispatching of charging and/or discharging. The closed-loop control subsystem adopts PID control module, and the adaptive model is constructed in the PID control module. And the initial parameters of the energy dispatching control of the energy storage system are processed by the adaptive model to obtain the PID adjusted and modified parameters. And the PID adjusted and modified parameters are used to modify the energy dispatching control parameters to realize parameter tuning, so that the control can adapt to the characteristics of the distributed energy storage system, deal with the uncertainty to achieve better control effect, and reduce the failure rate and maintenance cost.

In an embodiment, there are multiple groups of the battery module, and they are arranged in a distributed manner; and the energy dispatching subsystem monitors the real-time electric quantity, charging quantity and discharging quantity of each battery module;

the predetermined strategy of the energy dispatching model is that: generating multiple groups of dispatching schemes according to dispatching requirements, and predicting power generation and/or consumption by monitoring data; analyzing the charging and/or discharging loss of each group of dispatching schemes according to the prediction, and selecting the dispatching scheme with the lowest loss as the dispatching execution scheme.

The working principle and beneficial effects of the technical scheme are as follows: The energy storage system of this scheme is a modular distributed system, and there are multiple groups of the battery module, and they are arranged in a distributed manner; and the energy dispatching subsystem monitors the real-time electric quantity, charging quantity and discharging quantity of each battery module. What's more, setting the dispatching model in the energy dispatching subsystem, and predicting power generation and/or consumption by monitoring data; analyzing the charging and/or discharging loss of each group of dispatching schemes according to the prediction, and selecting the dispatching scheme with the lowest loss as the dispatching execution scheme, so that the energy consumption of the energy storage system can be reduced and the energy storage utilization rate can be improved.

In an embodiment, the voltage stabilizing and rectifying assembly comprises a rectifying circuit and a voltage stabilizing circuit, wherein the rectifying circuit converts the alternating current of the power generation equipment into the direct current, and the voltage stabilizing circuit stabilizes the voltage of the direct current to be the same as that of the battery module;

and the inverter assembly comprises an inverter bridge circuit, a logic control circuit and a filter circuit, wherein the inverter bridge circuit is used for converting the direct current of the battery module into alternating current; the filter circuit is used for carrying out the filter treatment of the alternating current; and the logic control circuit is used for carrying out the logic control of the process of converting the direct current into the alternating current.

The working principle and beneficial effects of the technical scheme are as follows: In this scheme, the alternating current of the power generation equipment is converted into direct current through the rectifying circuit, and the voltage of the direct current is stabilized to be the same as that of the battery module through the voltage stabilizing circuit, thus realizing the adaptation and connection between the power generation equipment and the battery module, and avoiding the damage to the equipment caused by different power supplies; The direct current of battery module is converted into alternating current by inverter bridge circuit, and the alternating current is filtered by filter circuit. The logic control circuit is used for carrying out the logic control of the process of converting the direct current into the alternating current, so that the direct current of battery module is converted into standard commercial power in China, and the converted power can be connected to most existing power supply networks for power supply, save transmission cost and realize energy storage and utilization.

In an embodiment, the energy dispatching subsystem is connected with a communication module, and the communication module is used for connecting the network to realize data interaction.

The working principle and beneficial effects of the technical scheme are as follows: In this scheme, the communication module is set for network connection to realize data interaction. Therefore, the remote terminal is allowed to access through the network for remote control and inquiry of energy dispatching, or for remote management, diagnosis and control software upgrade, thus reducing on-site maintenance management and controlling operation and maintenance costs.

In an embodiment, the energy storage system is a modular distributed system;

The closed-loop control subsystem is internally provided with an evaluation module, and the evaluation module adopts the following formula to calculate the stability index of control:

$$\tau = \sqrt{\sum_{i=1}^{n}\sum_{j=1}^{m}\frac{(w'_{i,j} - w_{i,j}) - \frac{1}{mn}\sum_{i=1}^{n}\sum_{j=1}^{m}(w'_{i,j} - w_{i,j})}{mn}}$$

In the above formula, $\tau$ represents the stability index of control; $w_{i,j}'$ represents the j-th parameter of the i-th device or module after tuning; and $w_{i,j}$ represents the acquired j-th parameter of the i-th device or module;

If the stability index of the control exceeds the set stability threshold, it indicates that there is a stability risk in the system, so an alarm signal will be sent.

The working principle and beneficial effects of the technical scheme are as follows: In this scheme, the evaluation module is set in the closed-loop control subsystem, and the evaluation module calculates and determines the stability index of the current system control by using the above formula, and the stability index is used to compare with the set stability threshold so as to evaluate the stability of the system control; For example, if the stability threshold is set to 0.5, if the stability index of the current control is less than or equal to 0.5, it indicates that the stability of the current system control is good; otherwise, it indicates that the system has stability risks, suggesting that corresponding measures should be taken to improve the stability, so as to ensure the safety and reliability of the system operation.

Obviously, those skilled in the field can make various changes and modifications to the present invention without departing from the spirit and scope of the present invention. Thus, if these modifications and variations of the present invention fall within the scope of the claims of the present invention and the technical equivalents of the invention, the present invention is also intended to include these modifications and variations.

What is claimed is:

1. A parameters tuning method of energy storage system is characterized in that it comprises the following steps:
   S100, using PID (Proportional, Integral and Differential) control module to construct a closed-loop control subsystem of energy dispatching model;
   S200, acquiring PID initial parameters according to the energy dispatching model of the energy storage system;
   S300, setting an adaptive model in the PID control module, and processing the PID initial parameters through the adaptive model to obtain PID adjusted and modified parameters;
   S400, using the PID adjusted and modified parameters to modify the PID initial parameters and get PID tuning parameters;
   wherein the closed-loop control subsystem is internally provided with an evaluation module, the evaluation module is configured to calculate a stability index of control and compare the stability index of control with a set stability threshold; if the stability index of control exceeds the set stability threshold, it indicates that there is a stability risk in the energy storage system, and an alarm signal is sent; and
   wherein the evaluation module adopts the following formula to calculate the stability index of control:

$$\tau = \sqrt{\sum_{i=1}^{n}\sum_{j=1}^{m}\frac{(w'_{i,j}-w_{i,j})-\frac{1}{mn}\sum_{i=1}^{n}\sum_{j=1}^{m}(w'_{i,j}-w_{i,j})}{mn}}$$

in the above formula, $\tau$ represents the stability index of control; $w_{i,j}'$ represents a j-th parameter of an i-th device or module after tuning; and $w_{i,j}$ represents an acquired j-th parameter of the i-th device or module;

wherein the parameters tuning method of energy storage system is characterized in that in step S200, a predetermined strategy set by the energy dispatching model is that: generating multiple groups of dispatching schemes according to dispatching requirements, and predicting power generation and/or consumption through monitoring data; analyzing charging and/or discharging loss of each group of dispatching schemes according to the prediction, and selecting the dispatching scheme with the lowest loss as the dispatching execution scheme; and wherein dispatching the charging and discharging according to the PID tuning parameters and the predetermined strategy.

2. The parameters tuning method of energy storage system according to claim 1 is characterized in that in step S300, the process of processing the PID initial parameters through the adaptive model to obtain the PID adjusted and modified parameters is as follows:

S310, determining the response curve of the closed-loop control subsystem under the unit step by using the PID initial parameters;

S320, predicting energy dispatching through the response curve, and carrying out prediction evaluation to obtain the predicted deviation amount;

S330, converting the predicted deviation amount into fuzzy variables by using the quantization factor, and obtaining the PID basic modified parameters according to the preset fuzzy rules;

S340, carrying out the fuzzy treatment of the PID basic modified parameters to obtain the PID adjusted and modified parameters.

3. The parameters tuning method of energy storage system according to claim 1 is characterized in that in step S320, the way of energy dispatching prediction through the response curve is as follows:

determining the response function according to the response curve;

determining the deviation direction by taking derivation of the response function in the prediction time domain;

calculating the deviation value through the response function with a predetermined prediction time;

combining the deviation direction with the deviation value to form a deviation vector;

determining the predicted deviation amount of the energy dispatching control parameters through the deviation vector.

4. The parameters tuning method of energy storage system according to claim 1 is characterized in that in step S400, after the PID tuning parameters are obtained, analyzing the stability of the system control through the PID tuning parameters, and sending out an alarm signal if the stability does not meet the requirements.

5. An energy storage system is characterized in that it comprises a battery module, a bidirectional converter device, an energy dispatching subsystem and a closed-loop control subsystem;

and the battery module comprises a plurality of lithium iron phosphate battery modules, and the lithium iron phosphate batteries arranged in the lithium iron phosphate battery modules are used for storing electric energy;

and the bidirectional converter device comprises a voltage stabilizing and rectifying assembly and an inverter assembly, wherein the voltage stabilizing and rectifying assembly and the inverter assembly are both connected with the battery module; the voltage stabilizing and rectifying assembly is connected with the power generation equipment and used for regulating the generated power to charge the batteries, and the inverter assembly is connected with the power transmission equipment and used for changing the electric energy stored in the batteries into the power supply that can be used by the electric equipment;

the energy dispatching subsystem is connected with the battery module and the bidirectional converter device respectively, and the energy dispatching subsystem is internally provided with an energy dispatching model, and the energy dispatching subsystem is used for monitoring the electric quantity of the battery module, and the energy dispatching model controls the bidirectional converter device to dispatch the charging and discharging according to PID (Proportional, Integral and Differential) tuning parameters and a predetermined strategy;

in addition, the closed-loop control subsystem comprises a PID control module, wherein the PID control module is internally provided with the adaptive model, and the adaptive model is used for obtaining PID adjusted and modified parameters by adopting a parameters tuning method of the energy storage system; and the PID control module uses the PID adjusted and modified parameters to modify the PID initial parameters and obtain the PID tuning parameters;

the closed-loop control subsystem is internally provided with an evaluation module, the evaluation module is configured to calculate a stability index of control and compare the stability index of control with a set stability threshold; if the stability index of control exceeds the set stability threshold, it indicates that there is a stability risk in the system, and an alarm signal is sent;

the evaluation module adopts the following formula to calculate the stability index of control:

$$\tau = \sqrt{\sum_{i=1}^{n}\sum_{j=1}^{m}\frac{(w'_{i,j}-w_{i,j})-\frac{1}{mn}\sum_{i=1}^{n}\sum_{j=1}^{m}(w'_{i,j}-w_{i,j})}{mn}}$$

in the above formula, $\tau$ represents the stability index of control; $w_{i,j}'$ represents a j-th parameter of an i-th device or module after tuning; and $w_{i,j}$ represents an acquired j-th parameter of the i-th device or module;

wherein the parameters tuning method comprises steps of:

S100, using PID control module to construct a closed-loop control subsystem of energy dispatching model;

S200, acquiring PID initial parameters according to the energy dispatching model of the energy storage system; and S300, setting an adaptive model in the PID control module, and processing the PID initial parameters through the adaptive model to obtain PID adjusted and modified parameters;

wherein the energy storage system is characterized in that there are multiple groups of the battery module, and they are arranged in a distributed manner; and the energy dispatching subsystem monitors the real-time electric quantity, charging quantity and discharging quantity of each battery module; and wherein the predetermined strategy of the energy dispatching model is that: generating multiple groups of dispatching schemes according to dispatching requirements, and predicting power generation and/or consumption by monitoring data; analyzing the charging and/or discharging loss of each group of dispatching schemes according to the prediction, and selecting the dispatching scheme with the lowest loss as the dispatching execution scheme.

6. The energy storage system according to claim 5 is characterized in that the voltage stabilizing and rectifying assembly comprises a rectifying circuit and a voltage stabilizing circuit, wherein the rectifying circuit converts the alternating current of the power generation equipment into the direct current, and the voltage stabilizing circuit stabilizes the voltage of the direct current to be the same as that of the battery module.

7. The energy storage system according to claim 5 is characterized in that the inverter assembly comprises an inverter bridge circuit, a logic control circuit and a filter circuit, wherein the inverter bridge circuit is used for converting the direct current of the battery module into alternating current; the filter circuit is used for carrying out the filter treatment of the alternating current; and the logic control circuit is used for carrying out the logic control of the process of converting the direct current into the alternating current.

8. The energy storage system according to claim 5 is characterized in that the energy dispatching subsystem is connected with a communication module, and the communication module is used for connecting the network to realize data interaction.

\* \* \* \* \*